US005517378A

United States Patent [19]

Asplund et al.

[11] Patent Number: 5,517,378

[45] Date of Patent: May 14, 1996

[54] DIRECT-CURRENT BREAKER FOR HIGH POWER FOR CONNECTION INTO A DIRECT-CURRENT CARRYING HIGH-VOLTAGE LINE

[75] Inventors: Gunnar Asplund; Victor Lescale; Carl E. Sölver, all of Ludvika, Sweden

[73] Assignee: ASEA Brown Boveri AB, Västerås, Sweden

[21] Appl. No.: 353,265

[22] Filed: Dec. 5, 1994

[30] Foreign Application Priority Data

Dec. 9, 1993 [SE] Sweden .............................. 9304097

[51] Int. Cl.[6] .............................................. H02H 3/033

[52] U.S. Cl. .............................. 361/4; 361/3; 361/8

[58] Field of Search .............................. 361/2, 4, 5, 6, 361/8, 9, 13

[56] References Cited

U.S. PATENT DOCUMENTS 3,611,031 10/1971 Lutz .
3,777,179 12/1973 Lutz .............................. 307/136
3,809,959 5/1974 Pucher .
4,171,532 10/1979 Sloan et al. .............................. 361/13
4,216,513 8/1980 Tokuyama et al. .............................. 361/13
4,420,784 12/1983 Chen et al. .............................. 361/7
5,214,557 5/1993 Hasegawa et al. .............................. 361/4

OTHER PUBLICATIONS

Abstract of SU 964758A May 14, 1981.

Description and Prospective Applications of New Multi Terminal HVDC System Concepts; Knudsen et al; Cigré; 1990 Session.

Entwicklung und Erprobung eines Versuchsschalters fur die Hochspannungs–Gleichstrom–Ubertragung; 30 Aug. 68; pp. 421–423.

*Primary Examiner*—A. D. Pellinen
*Assistant Examiner*—Sally C. Medley
*Attorney, Agent, or Firm*—Watson Cole Stevens Davis

[57] ABSTRACT

A high power d.c. breaker for connection into a d.c. carrying high-voltage line (L), has two normally closed and electrically series-connected mechanical breaks (BSI, BSII) adapted to be traversed by the line current (I) and to be opened for breaking the current. A capacitor (CB) is connected in parallel with the series connection of the breaks. A semiconductor member (HO) is connected in parallel with one of the breaks (BSI). Upon opening the breaks, a control member (SO) controls the semiconductor member such that a zero crossing of the current through the second break (BSII) is obtained, whereby the line current (I) is commutated over to the capacitor. (FIG. 1)

8 Claims, 6 Drawing Sheets

DIRECT-CURRENT BREAKER FOR HIGH POWER FOR CONNECTION INTO A DIRECT-CURRENT CARRYING HIGH-VOLTAGE LINE

TECHNICAL FIELD

The present invention relates to a d.c. breaker for high power for connection into a d.c. carrying high-voltage line, and with a breaking member which comprises a controllable semiconductor device and control members adapted to control the semiconductor member such that the current through the breaking member passes through zero, and with a capacitor which is connected in parallel with the breaking member and to which the current in the line is adapted commutate over after a zero crossing of the current through the breaking member.

BACKGROUND ART, PROBLEMS

In HVDC systems in general, and in particular in multi-station systems, there is a need of a d.c. breaker for example for isolating a faulty unit (converter, d.c. filter, d.c. pole, etc.) without having to interrupt the operation of the pole in question in all stations concerned. A plurality of d.c. breaker devices have been proposed, but all of them exhibit disadvantages, and none of the proposals has been used to any significant extent. A special problem with HVDC plants is the presence of smoothing reactors, which with their high inductance, typically 300–400 mH, render the interruption of a direct current in the plant very difficult.

Thus, from ETZ-A (89) 1968, No. 18, pp. 421–423, a d.c. breaker is known in which a circuit breaker is used to commutate the current from the main current path to an energy-absorbing parallel resistor. The residual current through the resistor is interrupted in this known breaker by means of a series-connected d.c. breaker of a special design. This residual current breaker must be designed to break at full line voltage. Such special d.c. breakers are expensive designs and require high development costs.

From U.S. Pat. No. 3,809,959 a d.c. breaker device is previously known, which has two series-connected mechanical breaks, for example breaks in an a.c. circuit breaker. A first break is connected in parallel with a varistor and with a capacitor in series with a spark gap. For breaking the current, this break is opened, whereby the current is intended to be transferred to the capacitor. This causes the voltage of the capacitor to grow rapidly and reach the knee voltage of the varistor, whereupon the varistor is to take over the direct current. The varistor voltage constitutes a counter voltage which drives the direct current in the circuit towards zero, whereupon the second break may be opened to obtain a galvanic insulation. An HVDC breaker of this prior art type has the disadvantage that the current through the break has no natural zero crossing, and the arc in the breaking member is in most cases either stable or insufficiently stable. This means that difficulties arise in obtaining a problem-free transfer of the current from the break to the capacitor, that is, difficulties in obtaining a satisfactory breaking function.

In the CIGRE report 14–201, 1990, p. 7, FIG. 10 with associated text, an HVDC breaker of the type stated in the introductory part of this description is proposed, in which the first break mentioned in the preceding paragraph is replaced by a gate turn-off thyristor connection, for example a series connection of gate turn-off thyristors (GTO thyristors). The thyristor connection must be dimensioned to take up all of the recovery voltage after the turn-off. It must, therefore, in practice consist of a large number of series-connected GTO thyristors. The thyristor connection continuously carries the current flowing through the d.c. breaker during normal operation, and the continuous current in practice also necessitates a parallel connection of GTO thyristors. The number of thyristors in the connection will thus be high. The thyristor connection and hence the d.c. breaker device therefore become complicated and expensive. Further, because of the continuous current, the losses and hence the costs due to the losses are high in the thyristor connection. The high continuous losses also necessitate an amply dimensioned cooling system for the thyristors. Finally, means are required for transfer of firing and turn-off signals between ground potential and the potential where the thyristor connection is arranged. All of these factors result in a d.c. breaker device of this proposed type becoming expensive and complicated.

U.S. Pat. No. 3,777,179 describes a d.c. breaker with first and second mutually series-connected mechanical breaks which are connected in parallel with a capacitor and which normally carry the load current of the breaker. The first break is connected in parallel with a gas discharge device which can be electromagnetically controlled to non-conducting state. Upon opening the breaks, the discharge device takes over the current through the first break. After deionization thereof, the discharge device is turned off, the capacitor takes over the load current and is charged to a counter voltage, and the second break is deionized. Gas discharge devices of the kind stated have proved to be less suitable for practical operation. Further, this device has the disadvantage that the rate of change of the current is high in connection with the zero crossing of the current through the second break. This results in the time for deionization of this break becoming short and in the voltage across the break growing rapidly. These factors cause the maximum voltage and current level, at which a certain break can be used, to become limited.

U.S. Pat. No. 3,611,031 describes a d.c. breaker of, in principle, the same configuration and function as the breaker described in the preceding paragraph.

Derwent Abstract No. 83-734248/32, week 8332. Abstract of SU-964-758-A, describes a device of a similar construction, in which the first break is connected in parallel with a gate turn-off thyristor connection which takes over the load current upon opening of the breaks, for example at a short circuit. When turning off the thyristor, the current thereof is taken over by a resistor which is connected in parallel with the first break and which limits the short-circuit current. However, no zero crossing of the current through the second break is obtained, and the device is therefore not suitable for use as a d.c. breaker. Further, the gate turn-off thyristor connection must be dimensioned for high voltage and becomes bulky and expensive.

U.S. Pat. No. 4,216,513 describes a d.c. breaker in which a mechanical break is connected in parallel with a series connection of a capacitor and an inductor. Under certain conditions regarding the load current and regarding circuit data, upon opening of the break, because of the negative current-voltage characteristic of the arc occurring, a natural oscillation with an increasing amplitude will be generated in the oscillating circuit formed by the capacitor, the inductance and the break. When the amplitude becomes equal to the load current, the resulting current through the break becomes zero, and a deionization can take place. Because of the dependence of the breaking operation on the prevailing current and on the prevailing circuit data, this device gives no reliable and controlled breaking under practical operating conditions.

SUMMARY OF THE INVENTION

The invention aims to provide a d.c. breaker of the kind stated in the introductory part of the description, which has a simple and economically favourable design and a minimum of power losses. More particularly, the object of the invention is to provide a d.c. breaker in which a conventional a.c. circuit breaker may be used for the mechanical breaks, in which the semiconductor device only need be dimensioned for a minor part of the recovery voltage and in which it is not continuously traversed by current, in which cooling systems and auxiliary power supply for the semiconductor device can be completely eliminated, and in which the need of signal transmission to or from the semiconductor device is completely eliminated. Further, the invention aims to provide a breaker which, independently of current operating data, achieves a reliable breaking under all conceivable operating conditions, and which makes possible a long deionization time of the last current-carrying break and hence the use of a certain break at high voltages and currents.

According to the invention, the main part of the d.c. breaker consists of a.c. components of standard type, such as a.c. power circuit breakers, a.c. capacitors and a.c. arresters. These components are combined with active components for generating a zero crossing of the current, that is, for an active destabilization of the arc in a break. What characterizes a d.c. breaker according to the invention will become clear from the appended claims.

BRIEF DESCRIPTION OF THE DRAWINGS

The invention will be described in more detail in the following with reference to the accompanying FIGS. 1–5, wherein.

DESCRIPTION OF THE PREFERRED EMBODIMENTS

Figure 1:
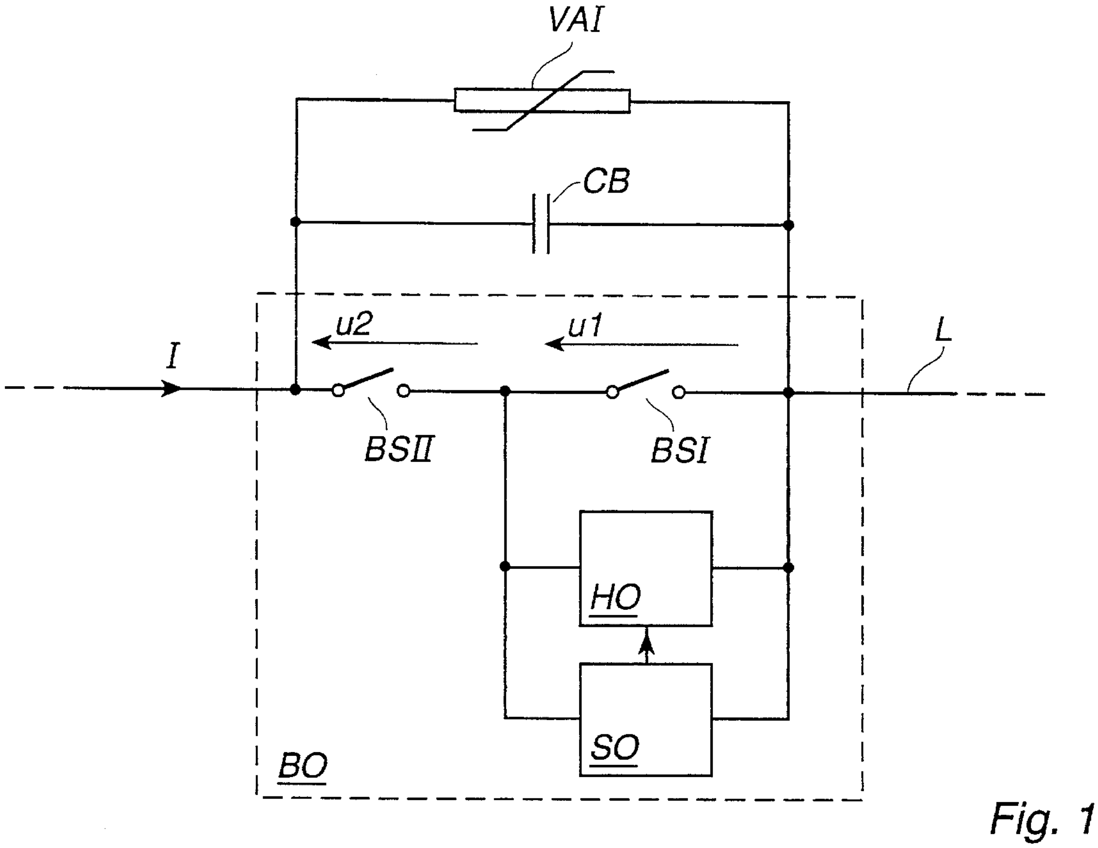
FIG. 1 shows the fundamental configuration of a d.c. breaker according to the invention.

FIG. 1 schematically shows an example of a device according to the invention. It is intended for connection into a d.c. carrying high-voltage line L, for example a line in a plant for power transmission by means of high-voltage direct current (an HVDC plant). The direct current in the line is designated I, and the object of the device is to make possible breaking of this current.

The device comprises a breaking member BO, the function of which is to carry the line current I during normal operation, that is, before the breaking, to cause the current through the breaking member to cease upon breaking, and thereafter to be able to take up the recovery voltage. The device further comprises a capacitor CB which is connected in parallel with the breaking member and to which, upon breaking, the line current is transferred from the breaking member BO. In parallel with the capacitor and the breaking member, a voltage-limiting element in the form of a surge arrester VAI, for example a conventional zinc-oxide arrester of a.c. type, is connected. The arrester limits the capacitor voltage during the breaking operation.

The breaking member BO comprises two breaks (contacts) BSI and BSII which are connected in series with each other. These consist of the two breaking elements in a conventional a.c. circuit breaker. In the embodiment referred to here, the a.c. circuit breaker consists of an $SF_6$ circuit breaker, for example of ABB's type HPL with two breaking elements. As a first step in a breaking operation, the two contacts BSI and BSII are opened simultaneously, or substantially simultaneously. The voltages across the breaks BSI and BSII are designated u1 and u2, respectively.

In parallel with the break BSI, a semiconductor member HO is connected, which, as will be described in more detail in the following, as a second step in the breaking operation, causes the current through the breaks BSI and BSII to cease. The semiconductor member is provided with a control member SO, which, as will be described below, is supplied and activated by the voltage—the arc voltage drop—which occurs across the break BSI upon opening of its contacts.

Upon cessation of the current through the breaking member, the line current I will be transferred to the capacitor CB and charge this capacitor. In the current path for the line there are current inductances, for example in the form of smoothing reactors in an HVDC transmission, which strive to maintain the current. The capacitor voltage increases rapidly, and this voltage constitutes a counter-voltage which causes the line current to decrease. Depending on the characteristics of the external circuit, the counter-voltage will either cause the current to cease before the voltage reaches the knee voltage of the arrester VAI, or the voltage reaches the knee voltage of the arrester before the current has ceased. In the latter case, the arrester takes over the current, the capacitor and arrester voltage becomes constant and equal to the knee voltage of the arrester, and this voltage finally causes the line current to cease.

Figure 2A:
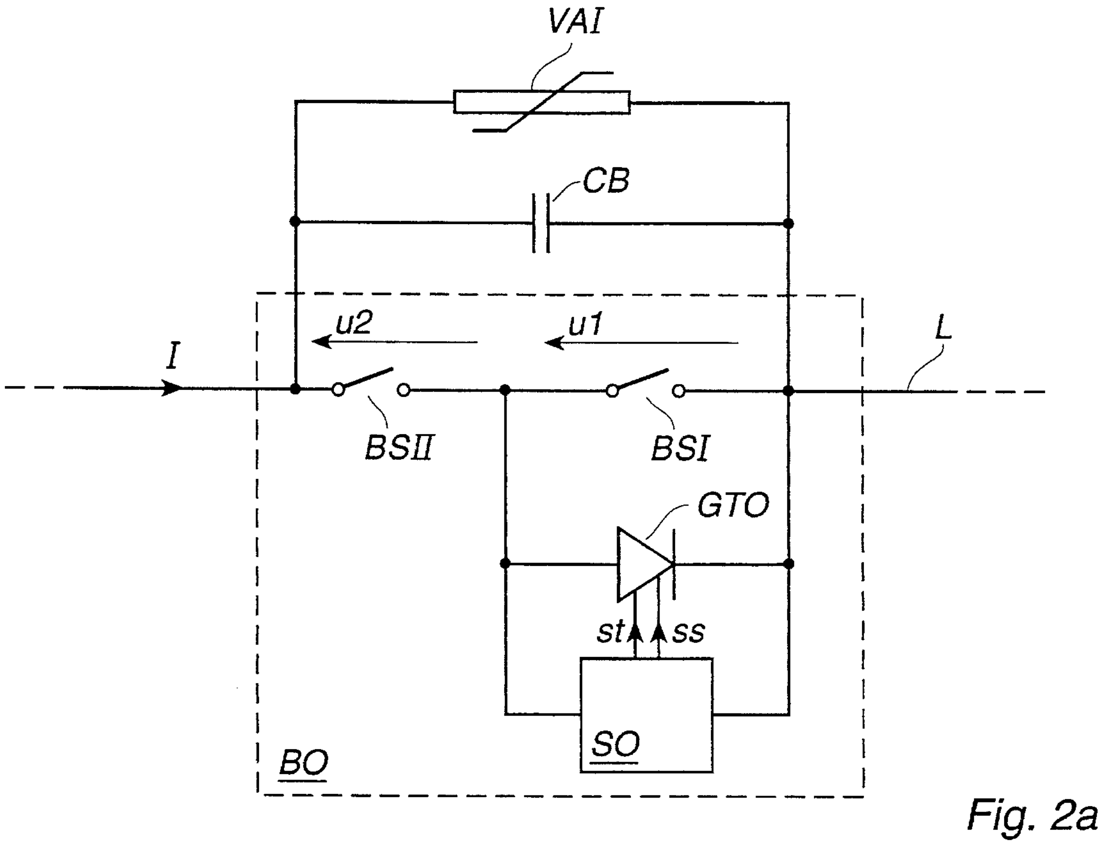
FIG. 2*a* shows in more detail a d.c. breaker device according to one embodiment of the invention.

A first embodiment of the invention will be described in more detail in the following with reference to FIGS. 2*a*–2*d*. The components of the main circuit are shown in FIG. 2*a*, and as is clear from this figure, the semiconductor member (HO in FIG. 1) in this embodiment consists of a gate turn-off thyristor connection. Since, from the point of view of voltage, the thyristor connection is only subjected to the arc voltage at the break BSI, that is, typically a few hundred volts, and since it only carries current for a very short interval during the breaking operation, the thyristor connection may primarily consist of one single GTO thyristor (possibly, in order to achieve redundancy, two series-connected thyristors may be used). Alternatively, depending on the voltage and current conditions of the circuit, the thyristor connection may consist of a series connection, a parallel connection, or a series-parallel connection of GTO thyristors.

The thyristor connection is supplied with a firing signal st and a turn-off signal ss from the control member SO.

Figure 2B:
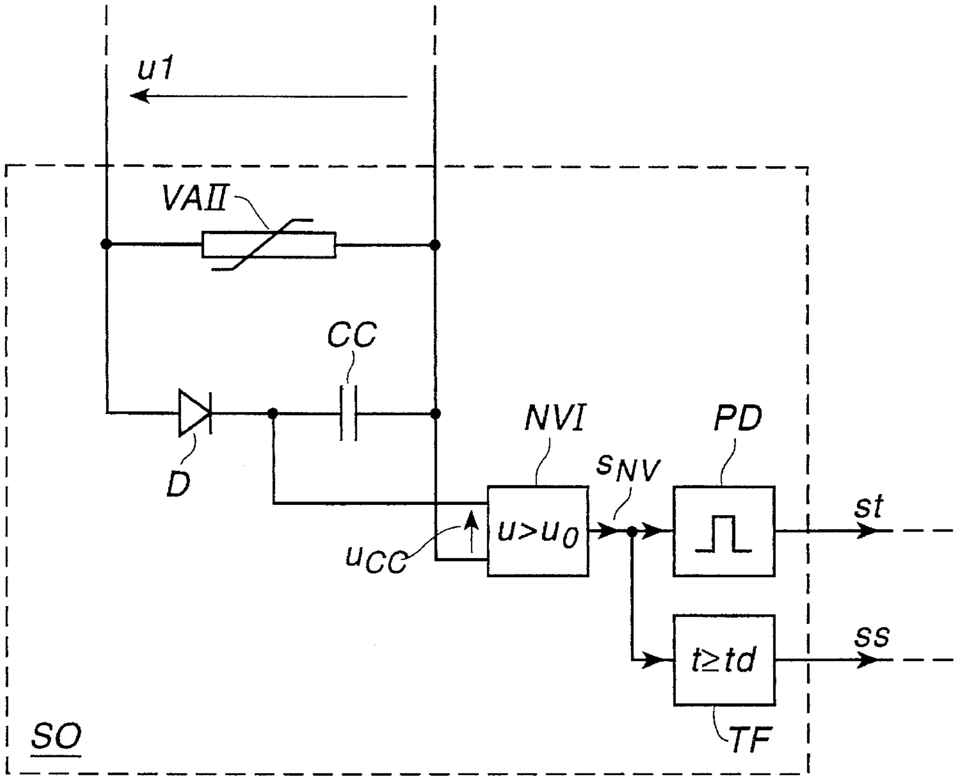
FIG. 2*b* shows an example of the embodiment of the control device in the device according to FIG. 2*a*.

The configuration of the control member is shown in FIG. 2*b*. As shown in FIG. 2*a* it is connected in parallel with the break BSI and is thus supplied with the voltage u1 across this break. The control member comprises a surge arrester VAII for limiting the voltage across the control member. In parallel with the arrester there is a series connection of a diode D and a capacitor CC. The capacitor voltage ucc is supplied to a level detector NVI. This level detector is adapted to deliver an output signal $s_{NV}$ when the capacitor voltage exceeds a predetermined limit value u0. The signal $s_{NV}$ is supplied to a firing pulse generating circuit PD as well as to a delay circuit TF. The circuit PD converts the signal $s_{NV}$ into a firing signal st of a suitable duration and level for firing the thyristors in the thyristor connection GTO. The delay circuit TF delivers a signal after a predetermined time interval td from receipt of the signal $s_{NV}$ and the output signal of the delay circuit is converted in a turn-off signal generating circuit PDII into a signal ss of a suitable duration and magnitude for turning off the thyristors in the thyristor connection GTO.

As mentioned, the voltage u1 constitutes also the supply voltage for the electronic circuits included in the control member, and the control device may, if necessary, be provided with suitable members for limiting, storing and filtering this supply voltage.

As will be clear from this description of the control member SO, no channels or members for power supply of the control member or for activation thereof in connection with a breaking operation are needed. Instead, both power supply and activation are obtained automatically from the voltage u1 across the break BSI when this voltage grows in connection with the contacts opening at the beginning of the breaking operation. The only signal which is needed for initiating the breaking operation is a conventional breaking order to the operating device of the a.c. circuit breaker, which operating device is normally arranged at ground potential.

Figure 2C:
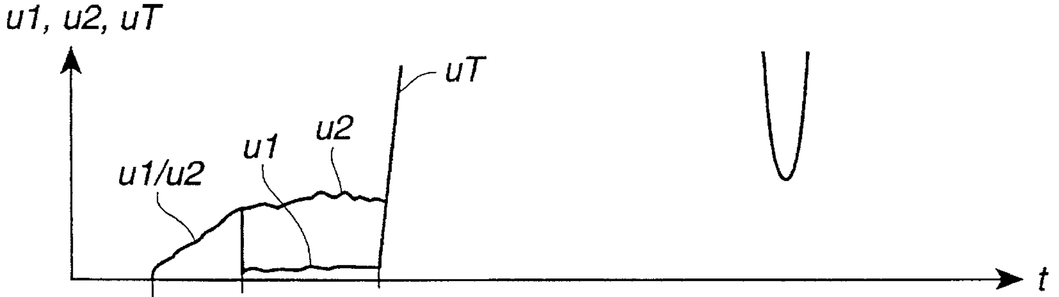
FIG. 2*c* shows, plotted against time, the voltages across the two breaks of the device as well as the total voltage across the device.
Figure 2D:
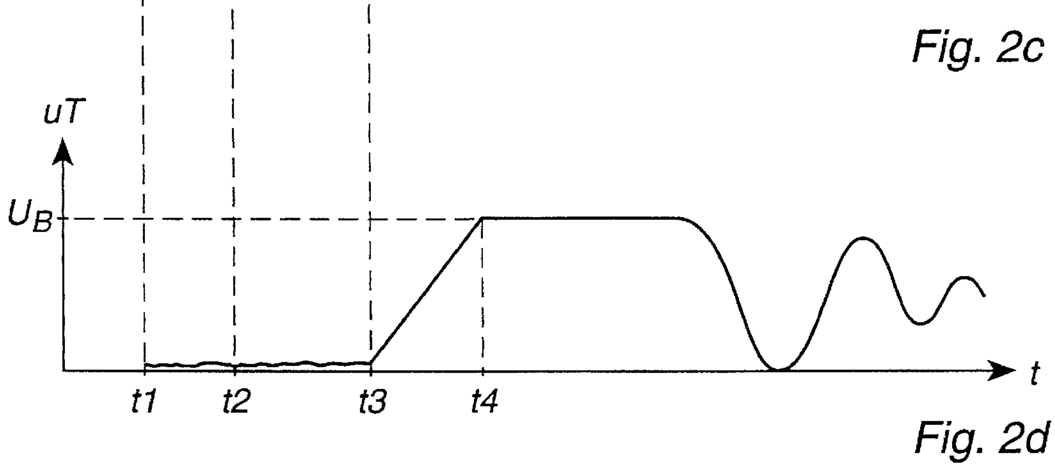
FIG. 2*d* shows on another voltage scale (but on the same time scale as in FIG. 2*c*) the total voltage across the device plotted against time.

A breaking operation will now be described with reference to FIGS. 2*c* and 2*d*. The figures show the voltages u1 and u2 across the breaks as well as the total voltage uT across the breaker (uT=u1+u2). The figures have the same time scale but the figures have different voltage scales, FIG. 2*c* showing the lower voltages prevailing during the earlier part of the breaking operation, FIG. 2*d* showing the higher voltages prevailing towards the end of the breaking operation. In FIG. 2*d*, $U_B$ is the knee voltage of the arrester VAI.

To break the current I in line L, the breaker is ordered to open its two breaks (contact pairs) BSI and BSII. The point in time when the contacts separate is designated t1 in FIGS. 2*c* and 2*d*. When the contacts separate, the current continues to flow, and an arc is established at each break. The arc voltage in a modern breaking element of $SF_6$ type is typically a few hundred volts. This voltage (voltages u1 and u2) is shown in FIG. 2*c*. It increases, as the contacts are separated, up to the time t2. At this time, the control member is charged and delivers a firing signal st to the thyristor connection GTO. This causes the thyristor connection to fire and the current to commutate over from the break BSI to the thyristor connection and the arc in this break to be extinguished.

After the time interval td determined by the control member, the control member delivers, at time t3=t2+td, a turn-off signal ss to the thyristor connection, and the thyristors in the thyristor connection are turned off. The time delay td has a duration so adapted that the current is able to commutate over from the break BSI to the thyristor connection, and that the break thereafter has time to recover to a sufficient extent to take up the voltage across the break occurring upon turn-off of the thyristor connection. When the thyristor connection is turned off, the voltage across the connection, and hence the total voltage uT across the breaker device, grow very rapidly. The current commutates over to the capacitor CB, the arc in the break BSII thus expiring and the current thus giving the rapid voltage increase across the capacitor and the breaker. The voltage distribution between the breaks BS1 and BSII is controlled by the arrester VAII of the control member, preferably such that only a few thousand volts will occur across the control member and the break BSI, the remainder of the total voltage occurring across the break BSII.

When the current has commutated over to the capacitor CB, the capacitor voltage uT will increase along a ramp function. As mentioned above, the capacitor voltage constitutes a counter-voltage to the external circuit and causes the line current I to decrease, the arrester VAI thus interfering and taking over the current if the knee voltage thereof is reached before the line current has ceased.

FIG. 2*d* shows this latter case, where the knee voltage of the arrester is reached at time t4. The voltage fluctuations towards the end of the breaking operation in FIG. 2*d* are caused by voltage and current not being changed continuously towards their steady states because in a typical case a plant comprises a d.c. line of a not negligible length, in which case reflections against the end points of the line occur.

The capacitor CB is dimensioned such that the rate of growth of the capacitor voltage also at the highest line current occurring does not exceed the value which the breaker can handle. For an HVDC transmission with the rated voltage 500 kVDC and a breaking current of 2 kA, a suitable value for the capacitance of the capacitor CB may be about 1 μF. This value gives—in combination with an assumed equivalent capacitance of 1 μF of the filters on the direct voltage side of the plant—a rate of growth of the recovery voltage of about 1000 kV/ms, which can be handled by a conventional a.c. circuit breaker, for example a breaker of four-chamber type.

The knee voltage of the arrester VAI should be so high that it gives a rapid cessation of the line current. However, it must not be so high that the voltage stresses on the other units in the plant exceed their maximum permissible values. In the above-mentioned case, a suitable value may be, for example, 800 kV.

The arrester VAII in the control member SO does not only protect the control member but also the thyristor connection GTO. The knee voltage of this arrester should be so high that the capacitor of the control member may be given sufficient charge for safe turn-off of the thyristor connection. However, it should suitably not be higher than that one single GTO thyristor may be used without the need for series connection of thyristors. A knee voltage of 2 kV to 2.5 kV has proved to be a suitable value.

A second embodiment of a device according to the invention will be described in the following with reference to FIGS. 3*a*–3*f*. The semiconductor member HO in FIG. 1 consists in this case of a power transistor of so-called IGBT type (IGBT=Insulated Gate Bipolar Transistor). The transistor is controlled by the control member SO, which delivers to the transistor a control signal sc which controls the impedance of the transistor such that it either assumes a low value or a high value, which permits the control to be carried out with small power losses in the transistor, that is, with large power handling capacity of the transistor. Otherwise, the device is built up in the same way as in the embodiment described above, however, with two exceptions. The control device SO is adapted for periodic control of the impedance of the transistor between a low and a high value. Further, an inductor X is connected in series with the capacitor CB, preferably a simple air inductor. The inductance of the inductor is chosen so as to form, together with the capacitor CB, an oscillating circuit with a suitable natural frequency, for example a few kHz.

Figure 3A:
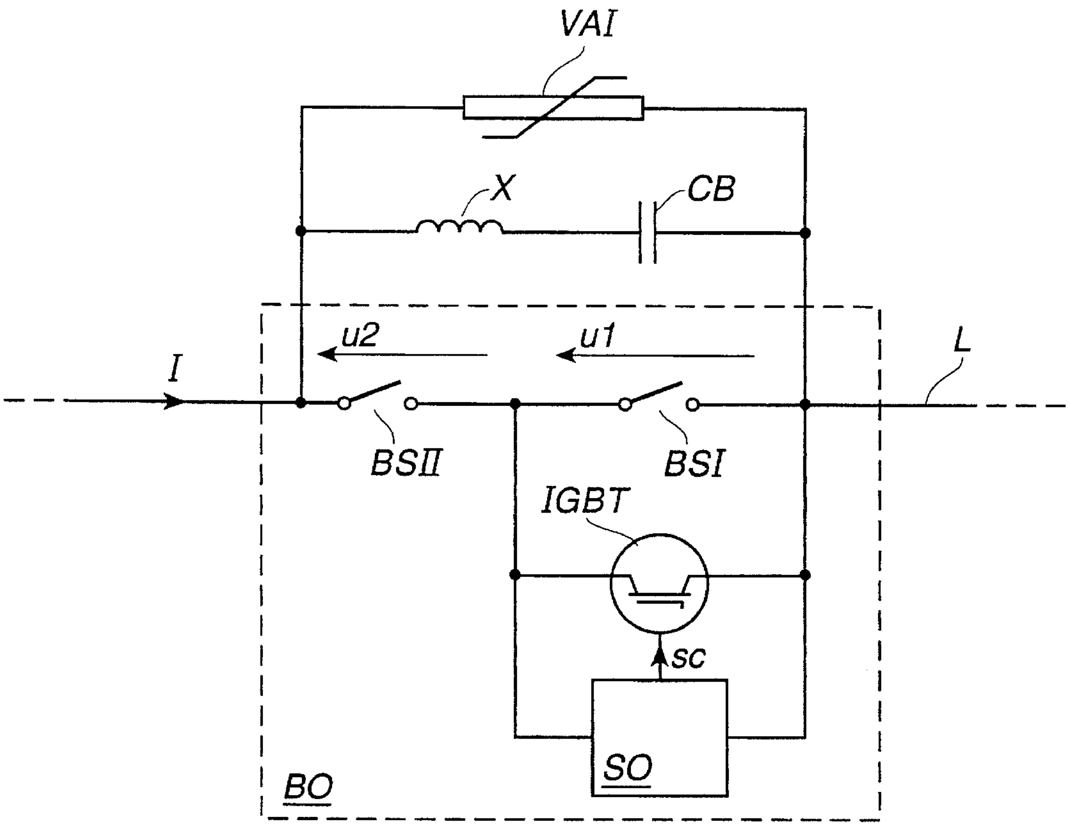
FIG. 3*a* shows another embodiment of a device according to the invention.
Figure 3B:
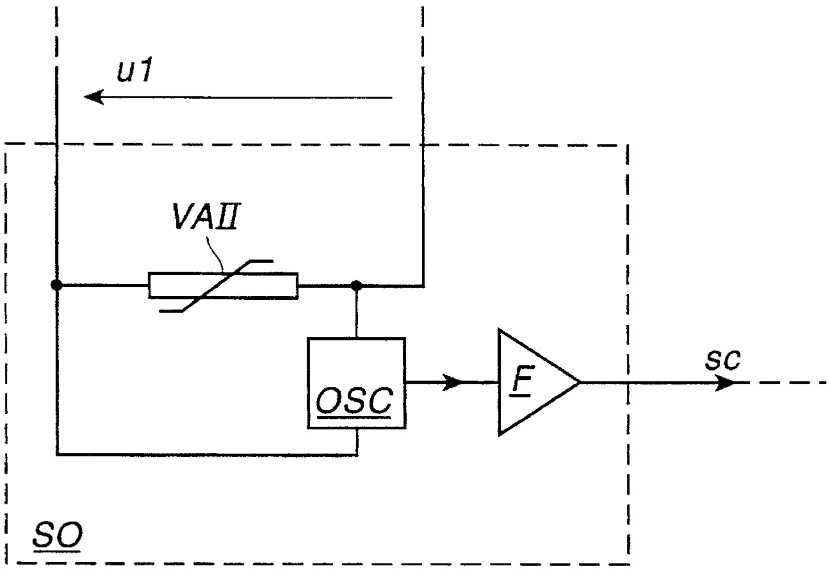
FIG. 3*b* shows an example of the embodiment of a control device in this embodiment.

An example of the configuration of the control member SO is shown in FIG. 3*b*. The voltage u1 across the break BSI is supplied to the control member and is limited to a harmless value by a surge arrester VAII. The voltage is supplied as supply voltage to an oscillator OSC. When the oscillator receives supply voltage, it starts operating and delivers a pulse train of square pulses. The oscillator is designed such that its output signal has the same frequency as the natural frequency of the oscillating circuit formed by the inductor X and the capacitor CB. The output signal from the oscillator is supplied to an amplifier F to achieve a suitable voltage level of the control signals sc to the transistor IGBT. The control signal sc is shown in FIG. 3*c* and FIG. 3*e*.

Figure 3C:
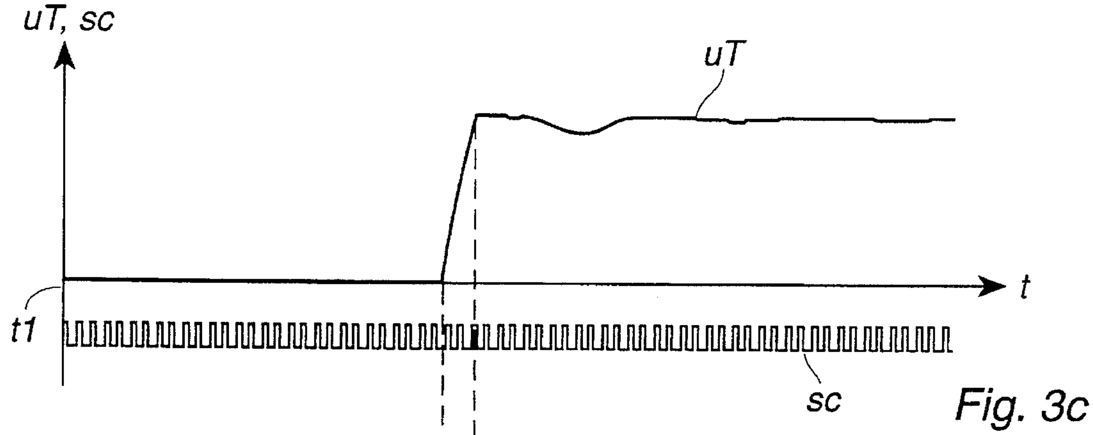
FIGS. 3*c* and 3*d* show, plotted against time, the total voltage across the device and the control signals to the transistor connection included in the device and the current flowing through the device, respectively.
Figure 3D:
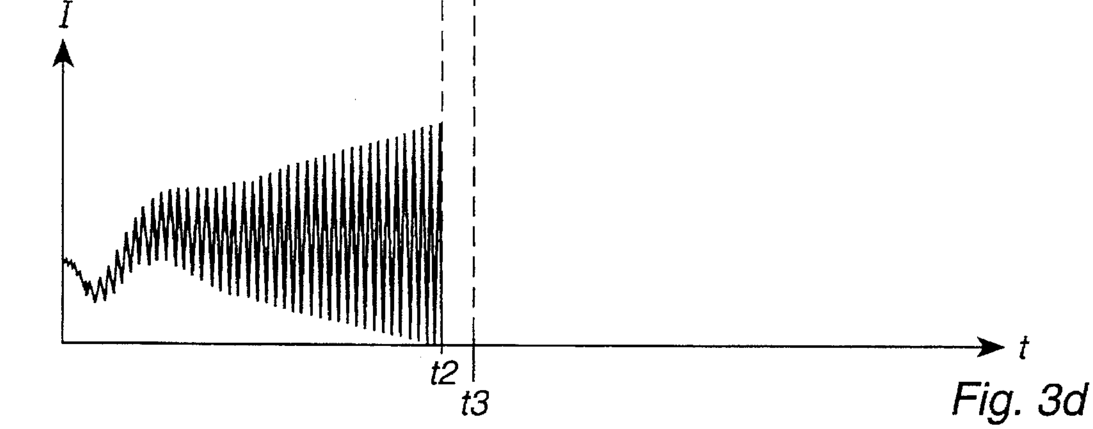
Figure 3E:
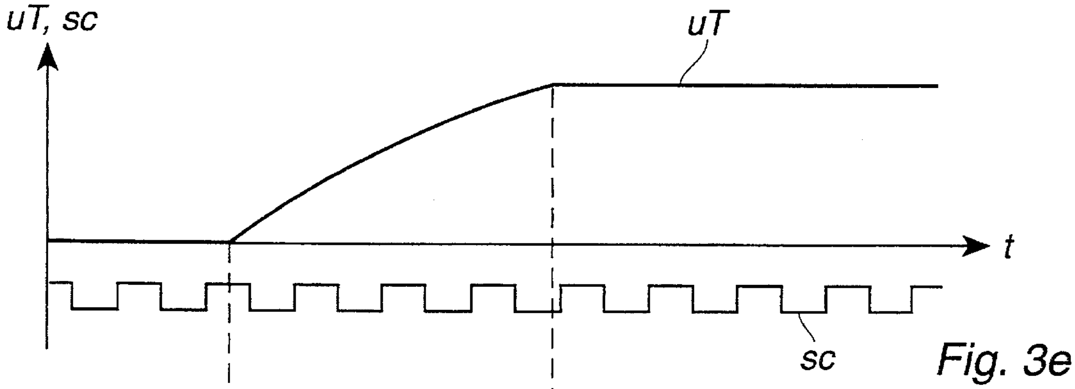
FIGS. 3*e* and 3*f* show on an expanded time scale the same quantities during a limited time interval.
Figure 3F:
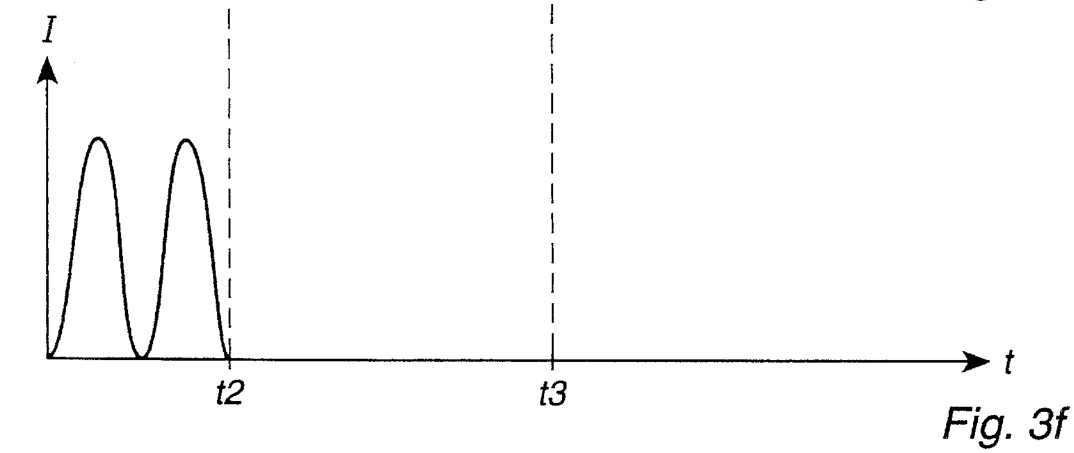

FIG. 3*c* shows the total voltage uT across the device and the control signal sc plotted against time. FIG. 3*d* shows the line current I plotted against time on the same time scale. FIGS. 3*e* and 3*f* show the same quantities as FIGS. 3*c* and 3*d*, but show on an expanded time scale the interval around that point in time where the current through the breaks passes through zero.

In the same way as described above regarding the first embodiment, a breaking operation is initiated by ordering the a.c. circuit breaker to open its contact pairs—the breaks BSI and BSII. The control member SO then receives supply voltage (at time t1 in the figures), the oscillator starts operating, and the transistor IGBT starts being controlled periodically between a low and a high impedance at the same rate as the natural frequency of the oscillating circuit X—CB. This control of the transistor excites an oscillation of the natural frequency and with growing amplitude in the circuit which is formed from the inductance x, the capacitor CB and the two breaks BSI and BSII. This oscillation generates an increasing alternating current which in the breaks is superimposed on the line current. As will be clear from the figures, the minimum value of the current through the breaks will successively approach zero, and at time t2 the current through the breaks passes through zero, causing the arcs burning in the breaks to become extinguished. When the arcs have been extinguished, the current is unable to oscillate back to the breaks and the oscillation ceases. The line current is commutated over from the breaks to the capacitor branch and causes a ramp voltage across the capacitor in the same way as in the first embodiment. The ramp is very steep, which is clear from FIGS. 3*c* and 3*e*. The inductance of the inductor X is typically so low that its influence on the circuit is negligible as from the cessation of the oscillation at time t2. After this time, the function is therefore the same as in the first embodiment. In the example shown in the figures, the capacitor voltage is assumed to reach the knee voltage of the arrester VAI before the line current has decreased to zero. The knee voltage is reached at time t3, and the counter-voltage maintains this value until the line current is caused to become discontinued by the counter-voltage.

In this embodiment (see FIG. 3*f*), the rate of change of the current is low at the time when the current through the break BSI passes through zero—approximately, the curve showing the current through the break plotted against time then is a tangent to the zero line. In this way, a check and limitation of the rate of change of the current are obtained. This gives the break BSI longer time for deionization, and a certain circuit breaker may therefore be used for higher voltage and power levels in this embodiment.

For an HVDC plant with the same data as for the first embodiment, that is, a rated voltage of 500 kV, a breaking current of 2 kA, and an equivalent filter capacity of 1 μF, the same values may be used for the capacitance of the capacitor CB—1 μF—and for the knee voltage of the arrester VAI—800 kV. A suitable value of the inductance of the inductor x is then, for example, 1 mH, which gives a natural frequency of the oscillation of about 5 kHz. The arrester VAII of the control member does not only protect the control member but also the transistor connection IGBT. The knee voltage of the arrester should be so low that one single transistor, or a small number of series-connected transistors, may be used. At the same time, the knee voltage should be so high that the oscillation of the transistors is sufficiently strong to provide such a rapidly growing oscillation that the zero crossing of the current takes place before too much energy has had time to develop at the breaks. A value of the knee voltage of between 1 kV and 2 kV has proved to be suitable. Since the semiconductor connection (the transistor IGBT) in this case feeds power to the LC circuit of the breaker device and, to a certain extent, also to the network/line, the semiconductor connection may need to be more amply dimensioned with regard to current and voltage than what is the case with the first-mentioned embodiment.

Figure 4:
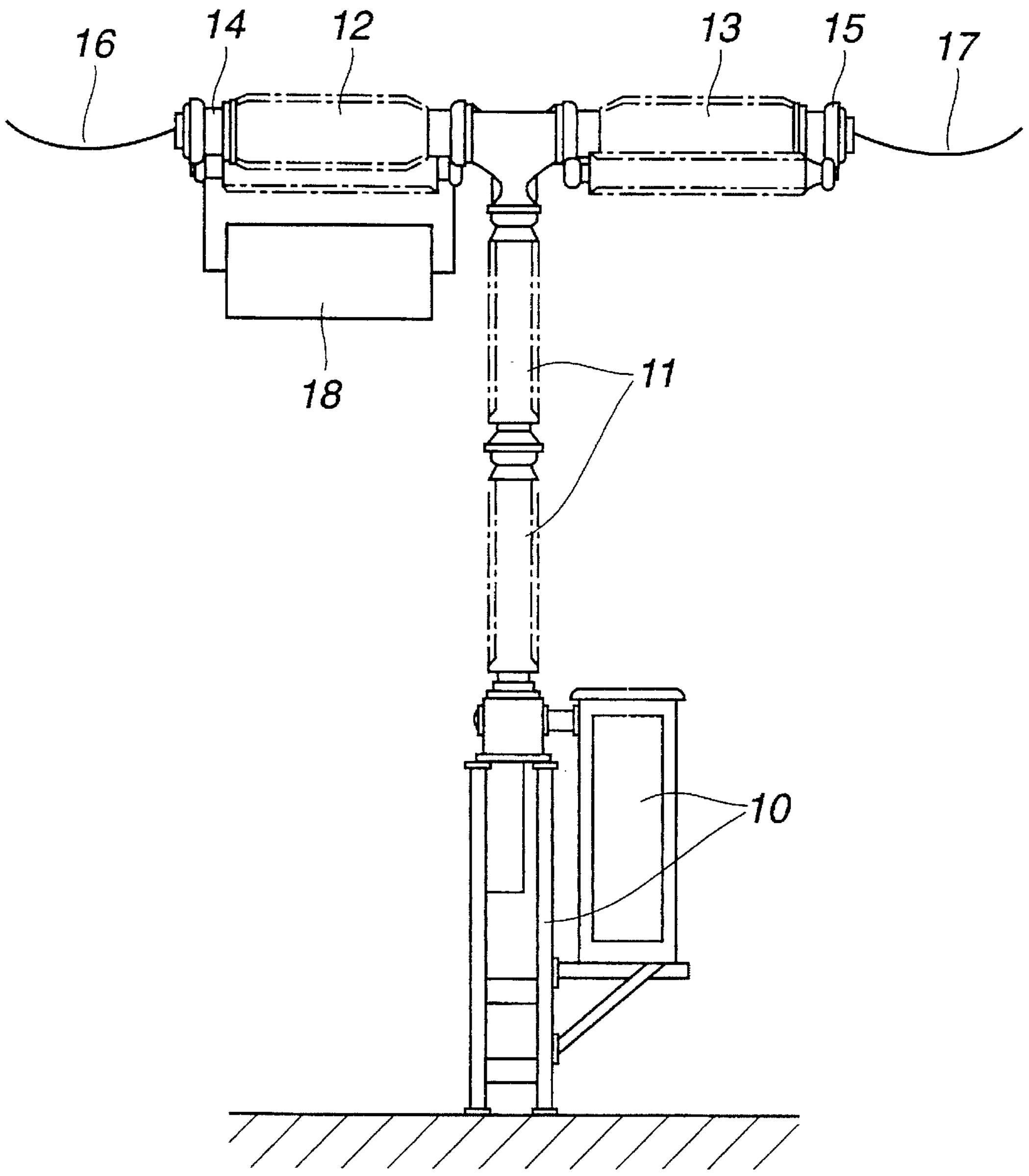
FIG. 4 shows how the semiconductor member included in a d.c. breaker device according to the invention may be arranged in a suitable enclosure and be mounted at potential on an a.c. circuit breaker included in the device.

FIG. 4 shows how the breaking member BO in FIG. 1 may be designed. It is composed of a single-pole a.c. circuit breaker of $SF_6$ type for outdoor erection. The breaker may, for example, be of the ABB HV Switchgear HPL-B type in the embodiment with two breaks per pole. The breaker is schematically shown. It has a base plate 10 on which the operating device (not shown separately) of the breaker is arranged. On the base plate 10 rests a support insulator 11 which provides the necessary insulation between the potential of the line and ground and which supports the breaks. In the two insulators 12 and 13 arranged at the upper part of the insulator 11, the two breaks of the breaker are arranged the break BSI in the insulator 12 and the break BSII in the insulator 13. To the end members 14 and 15 of the insulators 12 and 13, conductors 16, 17 are connected for connection of the breaker into the line. The semiconductor member HO and the control member SO are arranged in an apparatus housing (or enclosure) 18 designed for outdoor use, which is suspended from the breaker in parallel with the insulator 12. This allows the members arranged in the housing to become electrically parallel-connected to the break BSI in a simple manner. FIG. 4 does not show the capacitor CB included in the device or the arrester VAI, which capacitor or arrester may suitably be mounted on an insulated platform adjacent to the breaker.

Figure 5:
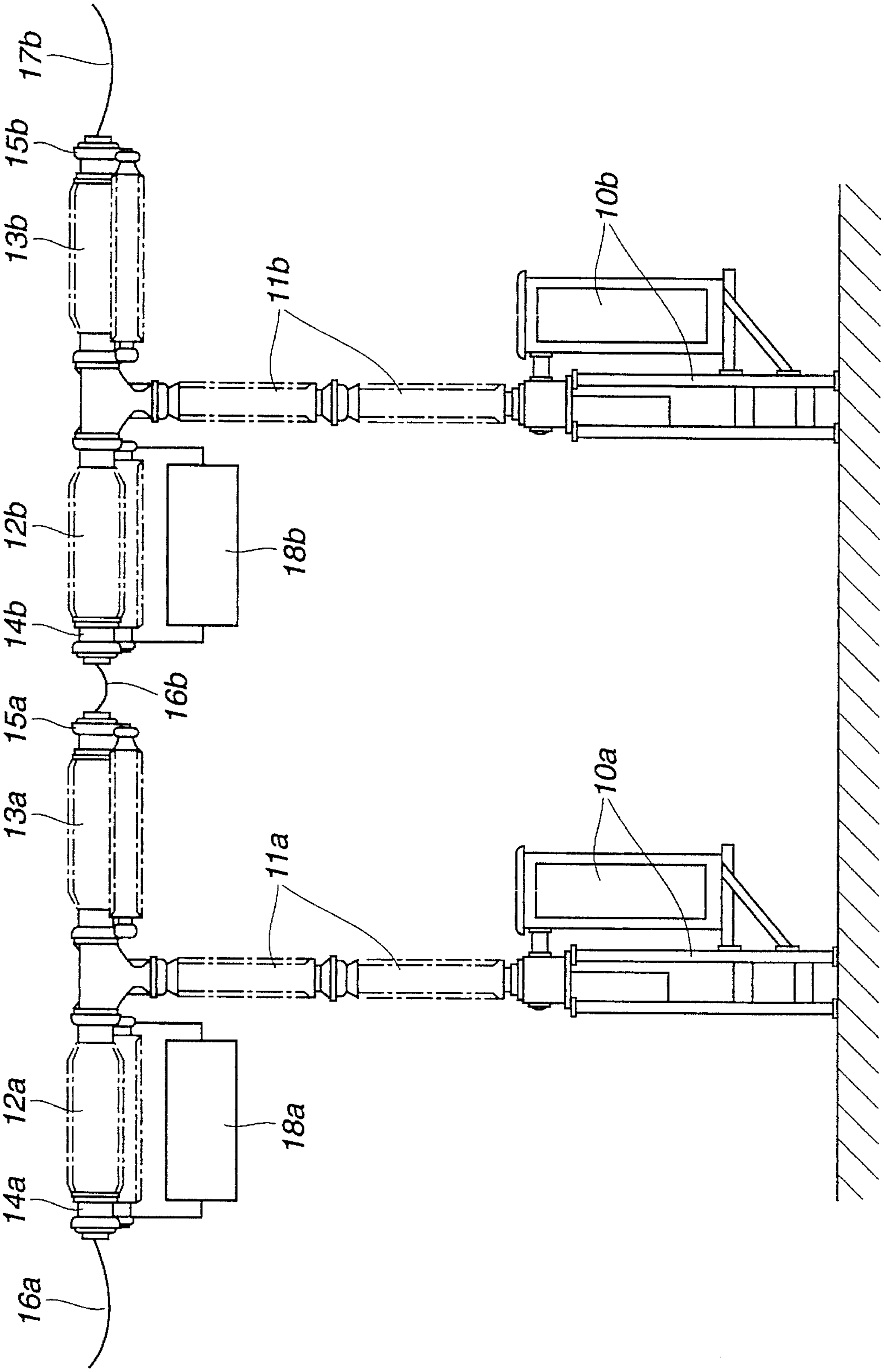
FIG. 5 shows how, at high voltages, two a.c. circuit breakers with associated semiconductor members may be arranged in series with each other.

At high voltage levels it may be suitable or necessary with more breaks than two to obtain the necessary maximum permissible voltage. FIG. 5 shows how this can be achieved according to an embodiment of the invention. In this device, two d.c. breakers of the kind shown in FIG. 4 are series-connected, whereby four series-connected breaks are obtained and hence increased voltage handling capacity. The breakers have the base plates 10*a* and 10*b*, the support insulators 11*a* and 11*b*, and the insulators 12*a*, 12*b*, 13*a*, 13*b* with breaks arranged therein and with the end members 14*a*, 14*b*, 15*a*, 15*b*. The semiconductor members of the breakers with their control members are arranged in the housings 18*a* and 18*b*, respectively. The d.c. circuit breakers are interconnected through a conductor 16*b*, and they are connected to the line via the conductors 16*a* and 17*b*. The two breakers are given breaking orders simultaneously. The two series-connected d.c. circuit breakers are provided with capacitors (not shown) and surge arresters (not shown) in the manner described above, and each one of the d.c. breakers operates in the manner described above.

The embodiments of the invention described above are only examples, and a large number of other embodiments are feasible within the scope of the invention.

Thus, semiconductor elements other than those described above may be used. For example, in the first embodiment described above, there may be used, instead of a GTO thyristor, a conventional thyristor or thyristor connection provided with a turn-off circuit, or, possibly, a suitable power transistor connection. Likewise, in the second of the two embodiments described, some other suitable power transistor or thyristor may be used instead of the described IGBT transistor.

In the above embodiments, a conventional a.c. circuit breaker of $SF_6$ type has been used as mechanical breaking member. Alternatively, of course, some other type of a.c. circuit breaker may be used, for example an oil minimum circuit breaker or an air-blast circuit breaker. Likewise, if desired, mechanical breaking members other than a conventional a.c. circuit breaker may be used.

The embodiments described above are designed for breaking a current with a certain given direction. The devices may, however, where necessary, be easily supplemented such that they may be used for breaking a current with an arbitrary direction. The semiconductor members may then—if necessary —be supplemented so as to be able to carry current in both directions, for example by adding a corresponding anti-parallel-connected semiconductor member. Further, the control and supply circuits of the control member must be designed or supplemented for operation at an arbitrary polarity of the supply voltage.

A d.c. breaker according to the invention provides considerable advantages in relation to prior art devices. Since a standard type a.c. circuit breaker may be used as a considerable part of the breaker, this may be designed in a reliable and economically favourable way. Such a breaker is relatively inexpensive and exceedingly reliable. In a device according to the invention, the semiconductor members need only be dimensioned for a fraction of the recovery voltage, and the semiconductor members carry current only for a short time interval during the actual breaking operation, typically about 10 ms. This entails very low losses. Further, a typical semiconductor element is able to manage, for such a short time, a current several times higher than during continuous operation. These factors enable an exceedingly simple configuration of the semiconductor members with only one single semiconductor component (or a small number of semiconductor components) and with no or a minimum need of a cooling system and auxiliary power. The small number of semiconductor components also entails a minimum requirement of control power. Furthermore, since both supply and activation of the semiconductor member and its control members are performed from the voltage across a break, the need of transmission of control signals and auxiliary power from ground potential to the members arranged at line potential is completely eliminated.

We claim:

1. A d.c. breaker for high power and for connection into a high-voltage d.c, line, and with a breaking member which comprises:

a) a controllable semiconductor device, b) control members to control the semiconductor member such that a zero crossing of the current through the breaking member is obtained, and with a capacitor which is connected in parallel with the breaking member and to which the current in said line is commutated over to said capacitor after a zero crossing of the current through the breaking member, the breaking member comprises first and second normally closed electrically series-connected mechanical breaks traversed by the current in said line and opened for breaking of said current, the capacitor is in parallel with the series connection of the two breaks, the semiconductor member is connected in parallel with said first break, the breaker comprises an inductive member which is connected in a circuit with the capacitor and the first and second breaks for forming an oscillating circuit comprising the inductive member, the capacitor and the first and second breaks, and the control members, in connection with the opening of the series-connected breaks, control the semiconductor member periodically for generating a growing oscillation in the oscillating circuit and hence a zero crossing of the current through the second break.

2. A breaker according to claim 1, further comprising voltage-limiting members connected in parallel with the breaking member, for limiting the voltage across the breaking member.

3. A breaker according to claim 1, wherein the control members are supplied with the voltage across the first break for power supply of the control members.

4. A breaker according to claim 1, wherein the control members are, in dependence on the voltage across the first break, activated for generating said oscillation.

5. A breaker according to claim 1, further comprising an a.c. circuit breaker and the mechanical breaks consist of breaks in the a.c. circuit breaker.

6. A breaker according to claim 5, wherein the semiconductor member and the control members are mounted at the potential level on the a.c. circuit breaker at the same potential level as said first and second breaks.

7. A breaker according to claim 1, wherein the control members comprise an oscillator to generate control signals for periodically turning on and off the semiconductor member with a frequency of the oscillating circuit.

8. A breaker according to claim 1, further comprising voltage-limiting members connected in parallel with said first break, for limiting the voltage across the break and the semiconductor member.

* * * * *